(12) United States Patent
Yoo

(10) Patent No.: US 10,408,621 B2
(45) Date of Patent: Sep. 10, 2019

(54) NAVIGATION DEVICE FOR VEHICLE, METHOD THEREFOR, AND NAVIGATION SYSTEM

(71) Applicants: Hyundai Motor Company, Seoul (KR); Kia Motors Corporation, Seoul (KR)

(72) Inventor: Kyung Ho Yoo, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 116 days.

(21) Appl. No.: 15/797,878

(22) Filed: Oct. 30, 2017

(65) Prior Publication Data

US 2019/0025059 A1    Jan. 24, 2019

(30) Foreign Application Priority Data

Jul. 21, 2017   (KR) ........................ 10-2017-0092812

(51) Int. Cl.
| | |
|---|---|
| *G01C 21/16* | (2006.01) |
| *G01S 19/49* | (2010.01) |
| *G01S 19/47* | (2010.01) |
| *G01S 19/28* | (2010.01) |

(52) U.S. Cl.
CPC ............ *G01C 21/165* (2013.01); *G01S 19/28* (2013.01); *G01S 19/47* (2013.01); *G01S 19/49* (2013.01); *B60W 2550/402* (2013.01); *B60W 2550/406* (2013.01)

(58) Field of Classification Search
CPC .......... G01S 19/05; G01S 19/03; G01S 19/10; G01S 19/47; G01S 19/49; G01C 21/165; B60W 2550/402; B60W 2550/406
See application file for complete search history.

(56) References Cited

U.S. PATENT DOCUMENTS

| | | | | |
|---|---|---|---|---|
| 2010/0328146 | A1* | 12/2010 | Xie ........................ | G01S 19/42 |
| | | | | 342/357.25 |
| 2011/0050488 | A1* | 3/2011 | Cole .................... | G01C 21/165 |
| | | | | 342/357.3 |
| 2012/0218145 | A1 | 8/2012 | Kee et al. | |
| 2013/0027247 | A1* | 1/2013 | Fodor ..................... | G01S 19/11 |
| | | | | 342/357.29 |

FOREIGN PATENT DOCUMENTS

| | | |
|---|---|---|
| KR | 10-0953471 B1 | 4/2010 |
| KR | 10-1203272 B1 | 11/2012 |
| KR | 10-1497592 B1 | 3/2015 |

* cited by examiner

*Primary Examiner* — Aaron L Troost
(74) *Attorney, Agent, or Firm* — Mintz Levin Cohn Ferris Glovsky and Popeo, P.C.; Peter F. Corless

(57) ABSTRACT

A navigation device for a vehicle includes a satellite antenna that receives a satellite signal from a satellite and a motion sensor that acquires motion information of the vehicle. A wireless communication module transmits location prediction information for predicting a location of the vehicle and receives an emulated-satellite signal from a server. A location estimating unit generates navigation information of the vehicle using at least one of the satellite signal and the emulated-satellite signal.

18 Claims, 9 Drawing Sheets

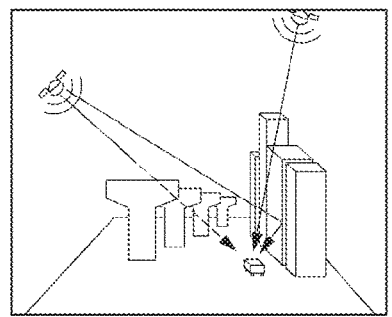 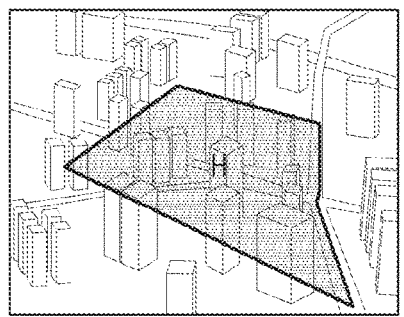
FIG. 7A                    FIG. 7B

NAVIGATION DEVICE FOR VEHICLE, METHOD THEREFOR, AND NAVIGATION SYSTEM

CROSS-REFERENCE TO RELATED APPLICATION

This application claims the benefit of priority to Korean Patent Application No. 10-2017-0092812, filed on Jul. 21, 2017, in the Korean Intellectual Property Office, the disclosure of which is incorporated herein in its entirety by reference.

TECHNICAL FIELD

The present disclosure relates generally to a navigation device for vehicle, a method therefor, and a navigation system, and more particularly, relates to technologies for fusing an emulated signal of a satellite received from a remote server with motion sensor information of a vehicle, and calculating a location of the vehicle.

BACKGROUND

A global navigation satellite system typically refers to a device which receives a satellite signal from an artificial satellite revolving around the Earth and which calculates a location of a given device based on the received satellite signal. However, since the number of observable satellites is reduced in environments where signals of satellites are interrupted (e.g., built-up areas, tunnels, underground parking lots, etc.), positioning errors are often caused. Positioning accuracy may be reduced, or may become entirely impossible.

Various techniques, such as fusing dead-reckoning, may be employed to compensate for the potential of interrupted satellite signals. A separate device for providing coordinates of a corresponding location may be utilized in areas where signals of satellites are interrupted. Methods for receiving location coordinates from such a device may also be used. However, if a current location of the device differs from the coordinates actually received, current location information may become inaccurate. Additional devices installed in areas where satellite signals are interrupted result in a waste of both time and money.

Meanwhile, airplanes, fighter planes, or the like use an expensive inertial measurement unit (IMU) for dead-reckoning. Vehicles and robots may calculate their locations through time integration using information acquired from sensing devices such as a wheel encoder, a speedometer, and a yaw rate sensor.

Even when satellite navigation and dead-reckoning are combined, a position error may increase over time. This may be generated by an accumulation of errors of the IMU itself. As performance of an IMU improves, the likelihood of position error by dead-reckoning may be more reduced. However, in this case, the overall price of a system may be increased due to the use of expensive IMU sensors.

SUMMARY

The present disclosure has been made to solve the above-mentioned problems occurring in the related art while advantages achieved by the related art are maintained intact.

An aspect of the present disclosure provides technologies for addressing a problem in which the overall price of a system is increased due to use of expensive sensors and addressing a divergence problem of a location error by error accumulation of the error itself.

An another aspect of the present disclosure provides technologies for a problem in which cost and time are wasted since a device which generates location coordinates should be installed if it is impossible to receive a satellite signal and a problem in which it is impossible to calculate an accurate location because of receiving location coordinates where the device is located.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, a navigation device for vehicle includes: a satellite antenna receiving a satellite signal from a satellite; a motion sensor acquiring motion information of the vehicle; a wireless communication module transmitting location prediction information for predicting a location of the vehicle and receiving an emulated satellite signal from a server; and a location estimating unit generating navigation information of the vehicle using at least one of the satellite signal and the emulated satellite signal.

The wireless communication module may be configured to, when it is impossible to receive the satellite signal, transmit the location predication information of the vehicle.

It is impossible to receive the satellite signal when: a visible satellite number is less than a predetermined reference number, an interrupted period of the satellite signal is greater than or equal to a predetermined time, or it is predicted that an interrupt signal of the satellite signal will be greater than or equal to the predetermined time.

The wireless communication module may be driven when the interrupted period is greater than or equal to the predetermined time.

The wireless communication module may be configured to transmit the location predication information of the vehicle when receiving the emulated satellite signal.

The location predication information may be obtained using at least one of dead-reckoning and map information.

The location estimating unit may be configured to generate navigation information of the vehicle by calculating a location of the vehicle using at least one of the satellite signal and the emulated satellite signal and fusing the calculated location of the vehicle with the motion information of the vehicle.

When both of the satellite signal and the emulated satellite signal are available, the location estimating unit may use the satellite signal to generate the navigation information of the vehicle.

Furthermore, according to embodiments of the present disclosure, a navigation method for a vehicle includes: receiving a satellite signal from a satellite; acquiring motion information of the vehicle using a motion sensor; transmitting location prediction information for predicting a location of the vehicle; receiving an emulated satellite signal from a server; and generating navigation information of the vehicle using at least one of the satellite signal and the emulated satellite signal.

The satellite signal and the emulated satellite signal may be simultaneously received.

The receiving of the emulated satellite signal from the server may include: verifying a location of an area where it is impossible to receive the satellite signal using map information; predicting an interrupt time of the satellite signal; determining whether the interrupt time is greater than or equal to a predetermined time; and when the interrupt time is greater than or equal to the predetermined time, receiving the emulated satellite signal.

The area where it is impossible to receive the satellite signal may include an area including any of a tunnel, a canyon area, a street tree, an overpass, and a skyscraper.

Furthermore, according to embodiments of the present disclosure, a system includes: a navigation device for a vehicle generating navigation information of the vehicle using at least one of a satellite signal and an emulated satellite signal; and a server generating the emulated satellite signal using location prediction information that predicts a location of the vehicle received from the navigation device.

The navigation device may include: a satellite antenna receiving a satellite signal from a satellite; a motion sensor acquiring motion information of the vehicle; a first wireless communication module transmitting location prediction information for predicting a location of the vehicle and receiving the emulated satellite signal from the server; and a location estimating unit generating navigation information of the vehicle using at least one of the satellite signal and the emulated satellite signal.

The server may include: a second wireless communication module receiving the location prediction information of the vehicle from the navigation device and transmitting the emulated satellite signal to the navigation device; and an emulated satellite signal controller predicting the location of the vehicle based on the location prediction information of the vehicle, calculating a location of a visible satellite based on the predicted location of the vehicle, and generating the emulated satellite signal from the visible satellite.

The second wireless communication module may be configured to, extracts the location prediction information of the vehicle through a decoding process when receiving the location prediction information of the vehicle; and when the emulated satellite signal is generated, encodes the emulated satellite signal and transmits the encoded emulated satellite signal to the vehicle.

The satellite signal emulated controller may be configured to transmit the location prediction information of the vehicle to the second wireless communication module; and predict the location of the vehicle based on at least one of a time processed in the server, a decoding time, a time when the emulated satellite signal is generated, and an encoding time.

The emulated satellite signal may include a satellite identifier (ID), satellite trajectory information, information of a satellite time, atmospheric errors, and an antenna error.

BRIEF DESCRIPTION OF THE DRAWINGS

The above and other objects, features and advantages of the present disclosure will be more apparent from the following detailed description taken in conjunction with the accompanying drawings:

FIGS. 7A and 7B are drawings illustrating an area where reception of a satellite signal is poor;

Figure 1:
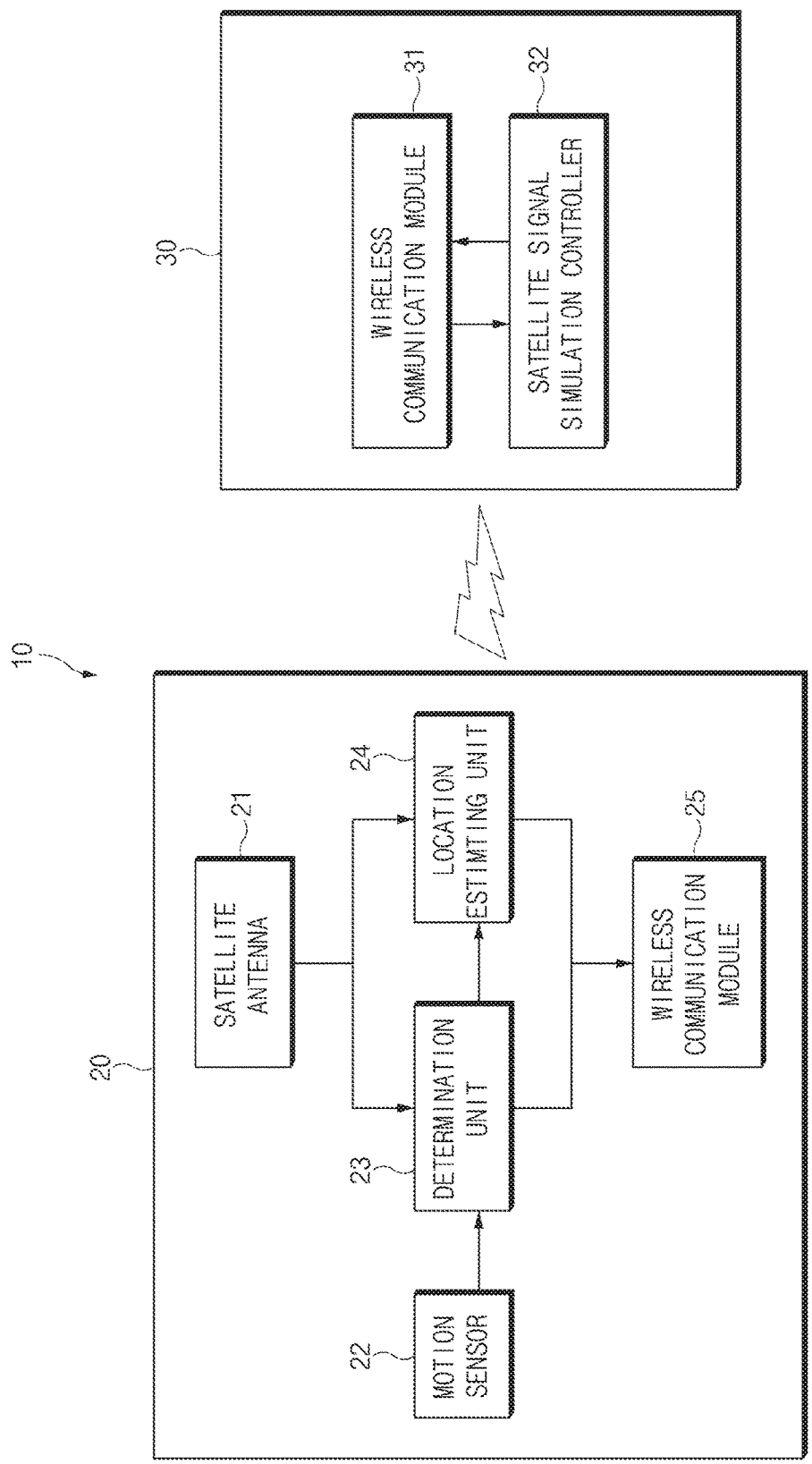
FIG. 1 is a block diagram illustrating a configuration of a system according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. In adding reference denotations to elements of each drawing, although the same elements are displayed on a different drawing, it should be noted that the same elements have the same denotations. In addition, in describing an embodiment of the present disclosure, if it is determined that a detailed description of related well-known configurations or functions blurs the gist of an embodiment of the present disclosure, it will be omitted.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the nature, turn, or order of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Furthermore, the control unit of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

FIG. 1 is a block diagram illustrating a configuration of a system according to embodiments of the present disclosure.

As shown in FIG. 1, a system 10 according to embodiments of the present disclosure may include a satellite navigation device 20 installed in a vehicle and a remote server 30.

The satellite navigation device 20 may include a satellite antenna 21, a motion sensor 22, a determination unit 23, a location estimating unit 24, and a wireless communication module 25.

The satellite antenna 21 may receive a satellite signal from an artificial satellite and may transmit the satellite signal to the location estimating unit 24.

The motion sensor 22 may obtain vehicle dynamics information. The vehicle dynamics information may include a vehicle speed, a yaw rate, or the like.

The determination unit 23 may determine whether to transmit location prediction information of a vehicle to the remote server 30. Herein, the locate prediction information of the vehicle may include location information of a vehicle predicted using dead-reckoning (inertial navigation) and/or map information (path information) in an area where it is impossible to receive a satellite signal. A description will be given in detail of the location prediction information of the vehicle.

According to embodiments of the present disclosure, if the number of receivable satellite signals is greater than or equal to a predetermined reference number, the determination unit 23 may allow the location estimating unit 24 to generate navigation information of the vehicle based on a satellite signal. If the number of receivable satellite signals is less than the predetermined reference number, the determination unit 23 may transmit the location prediction information of the vehicle to the remote server 30 via the wireless communication module 25.

Additionally, although the number of the receivable satellite signals is greater than or equal to the predetermined reference number, the determination unit 23 may transmit the location prediction information of the vehicle to the remote server 30 via the wireless communication module 25. In this case, the satellite navigation device 20 may receive an emulated satellite signal in advance. If the satellite signals of less than the predetermined reference number are received, it is possible for the satellite navigation device 20 to quickly replace the satellite signals with the emulated satellite signals.

The location estimating unit 24 may calculate its location, that is, a location of the vehicle in which the location estimating unit 24 is installed, according to a predetermined internal algorithm using the satellite signal received from the satellite antenna 21. Further, if the number of observed satellites, that is, if the number of satellite signals is greater than or equal to a predetermined reference number or if the number of the satellite signals is less than the predetermined reference number, the location estimating unit 24 may calculate a location of the vehicle using a emulated satellite signal. The location estimating unit 24 may generate navigation information by fusing the vehicle dynamics information obtained from the motion sensor 22 with the location of the vehicle. The navigation information may include a location of the vehicle, a speed of the vehicle, an azimuth, a current time, and longitude and latitude coordinates.

If it is impossible to receive a satellite signal from the satellite antenna 21 according to an embodiment or if the satellite signal is received, the wireless communication module 25 may transmit the location prediction information of the vehicle to the remote server 30. Further, the wireless communication module 25 may be usually in a power failure state according to an embodiment. If it is determined that it is impossible to receive a satellite signal, that is, if the number of satellite signals is less than a predetermined reference number, if a satellite signal is interrupted during a predetermined time or more, or if it is predicted that the satellite signal will be interrupted during the predetermined time, the wireless communication module 25 may be driven.

Meanwhile, the remote server 30 of FIG. 1 may include a wireless communication module 31 and a satellite signal emulated controller 32.

The wireless communication module 31 may receive the location prediction information of the vehicle from the wireless communication module 25 of the satellite navigation device 20.

If the wireless communication module 31 receives the location prediction information of the vehicle, the satellite signal emulated controller 32 may generate a emulated satellite signal. The emulated satellite signal may include trajectory information about all satellites constituting a global navigation satellite system.

The generated emulated satellite signal may be transmitted to the wireless communication module 31 of the remote server 30. The wireless communication module 31 may transmit the emulated satellite signal to the wireless communication module 25 of the satellite navigation device 20.

If the wireless communication module 25 of the satellite navigation device 20 receives the emulated satellite signal from the wireless communication module 31 of the remote server 30, the location estimating unit 24 may calculate a location of the vehicle using the emulated satellite signal and may generate navigation information.

The vehicle installed in the system 10 according to embodiments of the present disclosure may include an autonomous vehicle. The system 10 may be suitably used for a vehicle, such as the autonomous vehicle, in which positioning accuracy is an important requirement.

Figure 2:
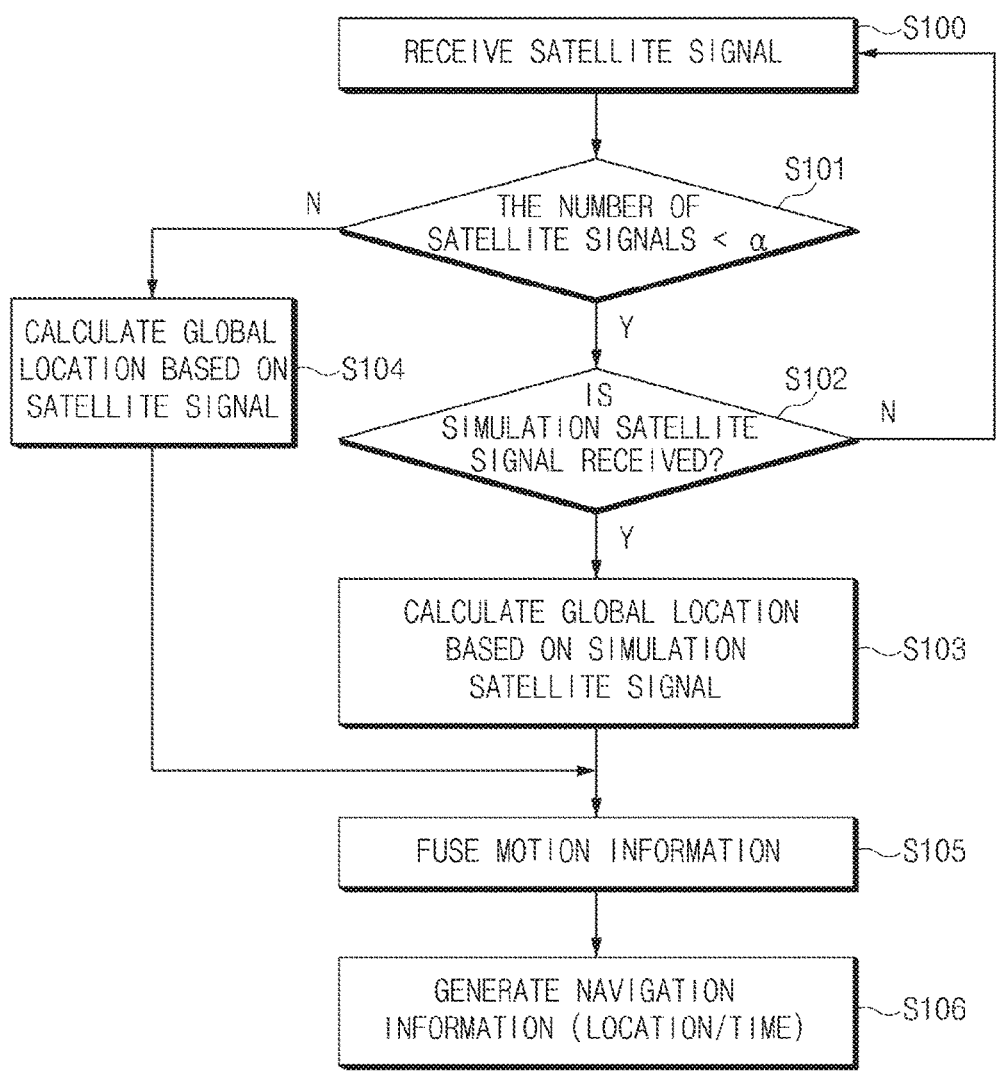
FIG. 2 is a flowchart illustrating a satellite navigation method according to embodiments of the present disclosure.

FIG. 2 is a flowchart illustrating a satellite navigation method according to embodiments of the present disclosure.

As shown in FIG. 2, in operation S100, a satellite antenna of a satellite navigation device may receive a satellite signal.

In operation S101, a location estimating unit may determine whether the number of satellite signals is less than a predetermined reference number a. The location estimating unit may perform an internal process for calculating its location (i.e., a location of a vehicle) based on the satellite signal. If the number of satellite signals is less than the predetermined reference number a, since it is impossible to calculate a location of the location estimating unit, in operation S102, the location estimating unit may determine whether a emulated satellite signal is received.

According to embodiments of the present disclosure, the predetermined reference number a may be 4. Thus, if the number of the satellite signals is less than 4, a wireless communication module of the vehicle may transmit location prediction information of the vehicle to a remote server. The location estimating unit may determine whether a emulated satellite signal generated using the location prediction information of the vehicle by the remote server is received. If the emulated satellite signal is not received (N), the location estimating unit may receive a satellite signal again.

If the emulated satellite signal is received (Y), in operation S103, the location estimating unit may calculate a global location of the vehicle based on the emulated satellite signal.

If the number of satellite signals is greater than or equal to the predetermined reference number (N), in operation S104, the location estimating unit may calculate a global location based on the satellite signal.

If calculating the global location of the vehicle based on any one of the satellite signal and the emulated satellite signal, in operation S105, the location estimating unit may fuse the global location of the vehicle with information obtained from a motion sensor installed in the vehicle, that is, a wheel speed, a yaw rate, or the like. In operation S106, the location estimating unit may generate navigation information. Thus, the location estimating unit may consecutively update a location of the vehicle.

Figure 3:
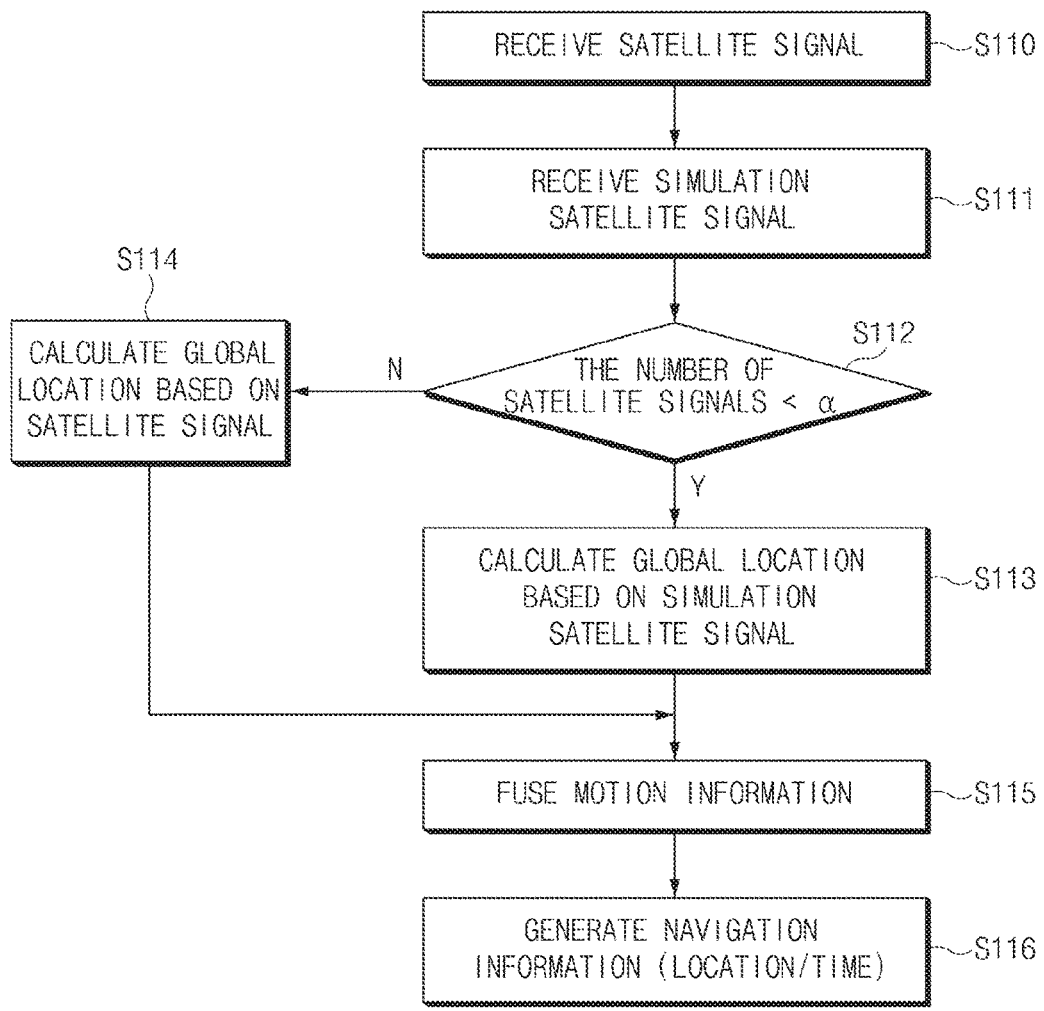
FIG. 3 is another flowchart illustrating a satellite navigation method according to embodiments of the present disclosure.

FIG. 3 is another flowchart illustrating a satellite navigation method according to embodiments of the present disclosure.

As shown in FIG. 3, in operation S110, a satellite antenna of a satellite navigation device may receive a satellite signal.

In operation S111, a location estimating unit may receive a emulated satellite signal. In embodiments of the present disclosure, for convenience of description, operation S110 and operation S111 are separately described. However, operation S110 and operation S111 may simultaneously progress. In operation S111, a wireless communication module of a vehicle may transmit location prediction information of the vehicle to a remote server irrespective of the number of the received satellite signals. The location estimating unit may include a process of receiving the emulated satellite signal generated using the location predication information of the vehicle by the remote server.

The location estimating unit may simultaneously receive the satellite signal and the emulated satellite signal through operations S110 and S111. In this case, the location estimating unit may calculate a global location of the vehicle based on the satellite signal by using the satellite signal in preference to the emulated satellite signal.

In operation S112, the location estimating unit may determine whether the number of the satellite signals is less than a predetermined reference number a. In an embodiment of the present disclosure, the predetermined reference number may be 4. If the number of the satellite signals is less than the predetermined reference number a (Y), in operation S113, the location estimating unit may calculate a global location based on the emulated satellite signal. On the other hand, if the number of the satellite signals is greater than or equal to the predetermined reference number a (N), in operation S114, the location estimating unit may calculate a global location based on the satellite signal. Thereafter, since operations S115 and S116 are the same as operations S105 and S106 of FIG. 2, a description about operations S115 and S116 may refer to a description about operations S105 and S106.

Figure 4:
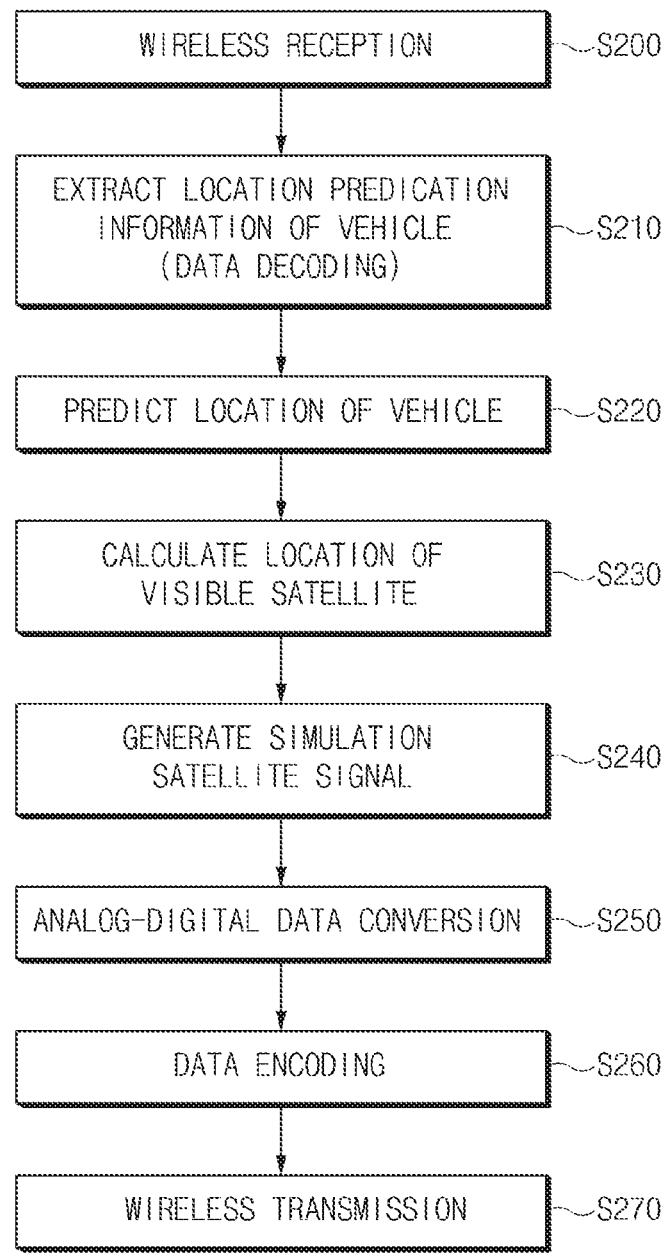
FIG. 4 is a flowchart illustrating a driving method of a remote server according to embodiments of the present disclosure.

FIG. 4 is a flowchart illustrating a driving method of a remote server according to embodiments of the present disclosure.

In the driving method of the remote server of FIG. 4, a description will first be given of an operation of transmitting location prediction information of a vehicle to a remote server at a navigation device according to an embodiment of the present disclosure and receiving the transmitted location prediction information of the vehicle at a wireless communication module of the remote server.

In operation S200, the wireless communication module may receive the location prediction information of the vehicle. In operation S210, the wireless communication module may perform a data decoding process to extract the location prediction information of the vehicle.

In operation S220, a satellite signal emulated controller may predict a location of the vehicle based on the location prediction information of the vehicle. Operation S220 may be performed using dead-reckoning (inertial navigation) and map information.

The location predication information of the vehicle may include information in which a current location of the vehicle is predicted in an area where it is impossible to receive a satellite signal. The location prediction information of the vehicle may be obtained using dead-reckoning based on information moved to reach the current location of the vehicle. Further, the location prediction information of the vehicle may include information in which a prediction location at which the vehicle will arrive in the area where it is impossible to receive a satellite signal. The location prediction information of the vehicle may be obtained using dead-reckoning and map information to predict a prediction location of the vehicle or using path information generated by setting a destination.

It is preferable to reflect a time delayed since data is transmitted and processed at a server as well as a speed of the vehicle to predict a more accurate location of the vehicle. Herein, the delayed time may include a wireless transmission time of data, a data decoding processing time, a time when a emulated satellite signal is generated and processed, and the like.

Since the satellite signal emulated controller includes trajectory information about all satellites constituting a global navigation satellite system, it may calculate a location of an observable visible satellite based on a predicted global location of the vehicle and time information.

If the location of the vehicle is predicted, in operation S230, the satellite signal emulated controller may calculate a location of the visible satellite based on the predicted location of the vehicle. Herein, the visible satellite may refer to a satellite a user may observe at a specific location.

For example, after a satellite is observed at time t to calculate a global location of the vehicle, as the vehicle enters a tunnel at time t+1, if a satellite signal is not measured, a location of the vehicle at time t+1 may be predicted through dead-reckoning and/or map information (path information). A location of the visible satellite may be calculated at a location predicted in such a method.

If the location of the visible satellite is calculated, in operation S240, the satellite signal emulated controller may generate a emulated satellite signal to be transmitted to the vehicle.

The emulated satellite signal may include information of the visible satellite. The information of the visible satellite may include information requested to calculate a location of the vehicle, for example, a satellite identifier (ID), satellite trajectory information, satellite time information, and the like, may include atmospheric errors, for example, ionospheric errors, tropospheric errors, and the like to generate more real information, and may include an antenna error and the like.

In operation S250, the satellite signal emulated controller may convert the emulated satellite signal including the above-mentioned satellite information into a digital form.

In operation S260, a wireless communication module may encode the emulated satellite signal according to a data protocol to transmit the emulated satellite signal converted into the digital form to the vehicle.

In operation S270, the wireless communication module may wirelessly transmit the encoded emulated satellite signal to the vehicle.

Figure 5:
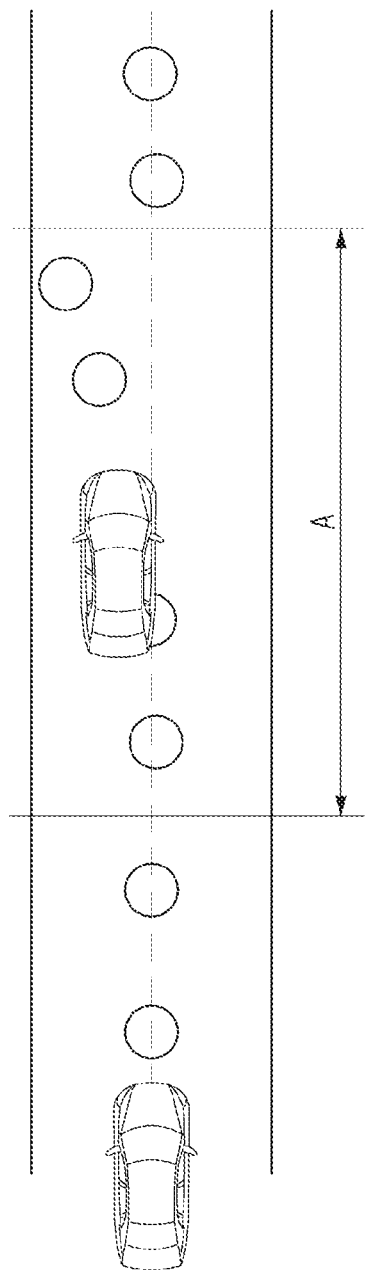
FIG. 5 is a drawing illustrating an example in which a satellite signal is locally interrupted.

FIG. 5 is a drawing illustrating an example in which a satellite signal is locally interrupted. A description will be given of an example in which a satellite signal is locally interrupted with reference to FIG. 5.

An expressway is an environment where reception of a satellite signal is relatively good, but there is a section where signal reception is locally bad, for example, a tunnel, a canyon area, or the like. If a time when reception of a satellite signal interferes or is interrupted is short, although a location of the vehicle is estimated through dead-reckoning, an error may fail to greatly diverge.

However, if interference or interrupt of the satellite signal continues long, for example, when the vehicle passes a long tunnel of a dozen of kilometers or more, as shown in 'A' of FIG. 5, a position error may diverge. As such, if it is impossible to receive a satellite signal, the present disclosure may consecutively update a location of the vehicle by receiving a emulated satellite signal and may continuously provide an accurate location of the vehicle.

Figure 6:
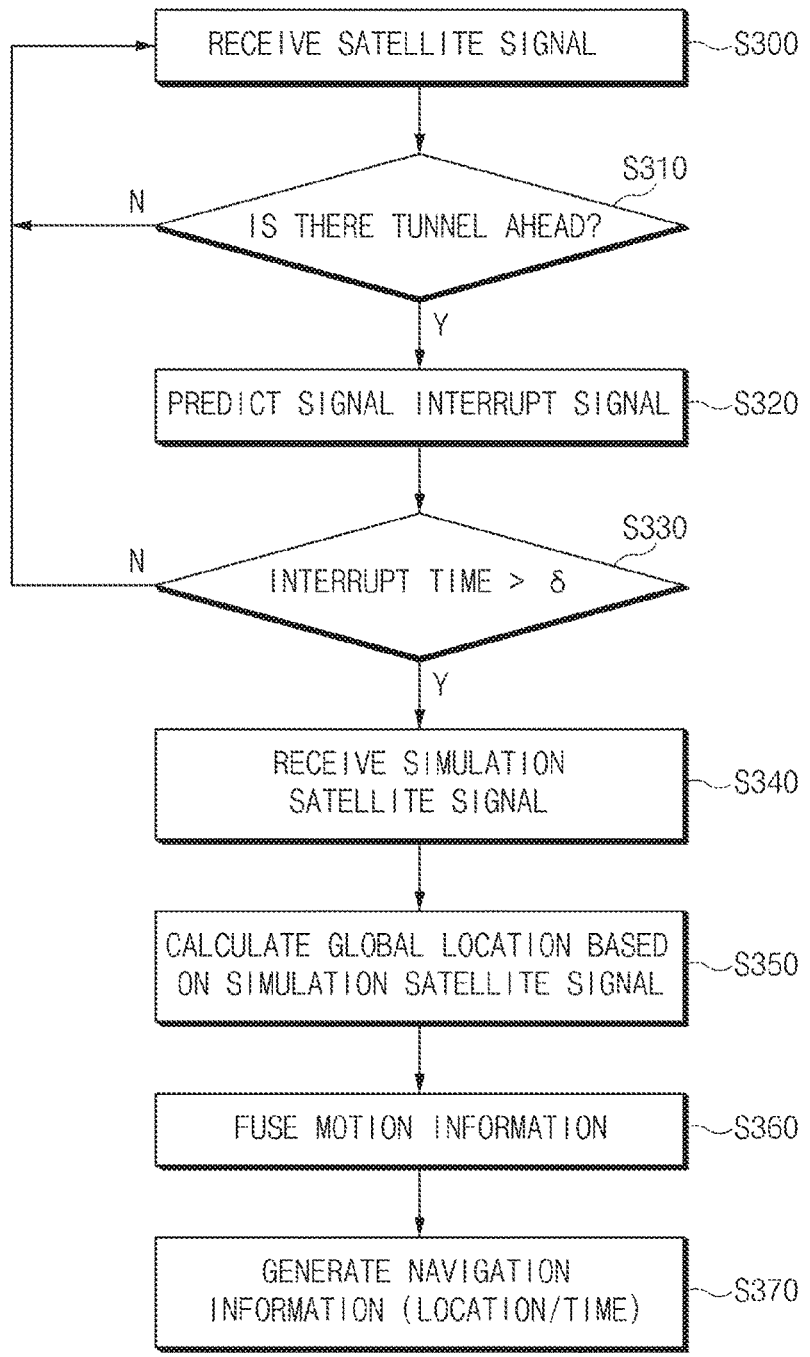
FIG. 6 is another flowchart illustrating a satellite navigation method according to embodiments of the present disclosure.

FIG. 6 is another flowchart illustrating a satellite navigation method according to embodiments of the present disclosure.

In operation S300, a satellite signal may be received through a satellite antenna.

In operation S310, it may be determined that there is a tunnel ahead using map information.

If there is no tunnel (N), a satellite may be received and a global location may be calculated based on the satellite signal to generate navigation information of a vehicle. Meanwhile, if there is a tunnel (Y), in operation S320, an interrupt time of the satellite signal may be predicted. A length of the forward tunnel may be determined using map information, and the interrupt time of the satellite signal may be predicted based on a current speed of the vehicle.

In operation S330, it may be determined that the interrupt time of the satellite signal is greater than or equal to a predetermined time δ. The predetermined time δ may refer to a time when a position error diverges due to an interrupt of the satellite signal.

If the interrupt time of the satellite signal is less than the predetermined time δ, since the position error does not greatly diverge and since it is possible to receive a satellite signal again with the predetermined time δ, the satellite signal may be received. Meanwhile, if the interrupt time of the satellite signal is greater than or equal to the predetermined time δ (Y), since it is impossible to receive the satellite signal, in operation S340, an emulated satellite signal may be received. Operation S340 may include a process where a wireless communication module of the vehicle transmits location predication information of the vehicle to a remote server, where the remote server generates an emulated satellite signal based on the transmitted location predication information of the vehicle, and where a location estimating unit receives the emulated satellite signal.

In operation S350, a global location of the vehicle may be calculated based on the emulated satellite signal.

In operation S360, the global location of the vehicle, calculated based on the emulated satellite signal, may be fused with information obtained from a motion sensor installed in the vehicle, for example, a wheel speed, a yaw rate, or the like. In operation S370, navigation information may be generated. Thus, although an interrupt time of a satellite time is long, for example, although the vehicle enters a tunnel, the navigation information of the vehicle may be consecutively generated.

FIGS. 7A and 7B are drawings illustrating an area where reception of a satellite signal is poor.

As shown in FIG. 7A, there may be various structures which interrupt reception of a satellite signal in a downtown area. Since reception of a satellite is limited due to a variety of environment elements, such as, a street tree, an overpass, and a skyscraper, while a vehicle is drive, the number of receivable satellite signals may be changed.

Receiving an emulated satellite signal always rather than receiving a satellite signal in an area where reception of a satellite signal is poor may be favorable to stably operate a system.

As shown in FIG. 7B, an area (harsh area) H where reception of a satellite signal is bad may be predefined. When the vehicle enters the area H, it may be configured for a remote server to receive an emulated satellite signal always.

The area where the reception of the satellite signal is poor may be defined as an area with a great difference between the number of satellites predicted to be observed and the number of satellites actually measured or may be defined as an area where a dilution of precision (DOP) numeric value is high through a value of DOP which is one of indexes for estimating location accuracy of a global navigation satellite system. As a DOP numeric value is lower, accuracy of location estimation may be higher since satellites are more evenly distributed in the sky. Since satellites are not evenly distributed in the sky if the DOP numeric value is high, it may be understood that it is difficult to receive a satellite signal.

Figure 8:
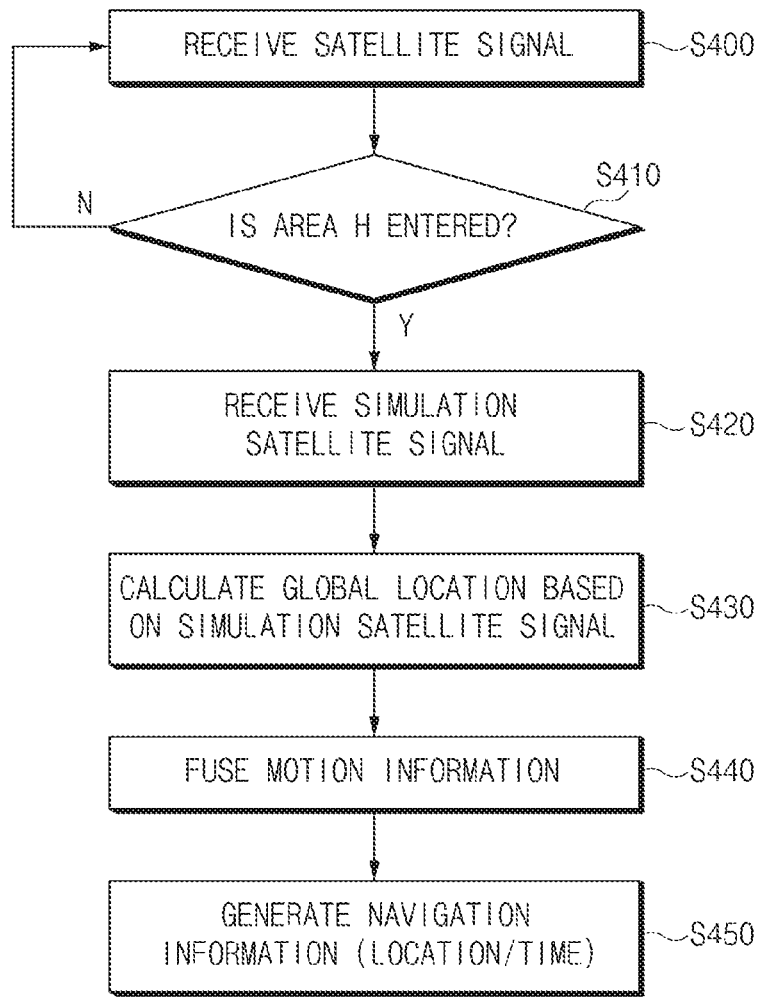
FIG. 8 is another flowchart illustrating a satellite navigation method according to embodiments of the present disclosure.

FIG. 8 is another flowchart illustrating a satellite navigation method according to embodiments of the present disclosure.

In operation S400, a satellite signal may be received through a satellite antenna.

In operation S410, it may be determined whether a vehicle enters an area H where reception of the satellite signal is bad, using map information.

If there is no area H where the reception of the satellite signal is poor (N), a satellite signal may be received and a global location may be calculated based on the satellite signal to generate navigation information of the vehicle. Meanwhile, if there is the area H where the reception of the satellite signal is poor (Y), in operation S420, a emulated satellite signal may be received always.

In operation S430, a global location of the vehicle may be calculated based on the emulated satellite signal.

In operation S440, the global location of the vehicle, calculated based on the emulated satellite signal, may be fused with information obtained from a motion sensor installed in the vehicle, for example, a wheel speed, a yaw rate, or the like. In operation S450, navigation information may be generated. Thus, the navigation information of the vehicle may be consecutively generated in the area H where the reception of the satellite signal is poor.

Figure 9:
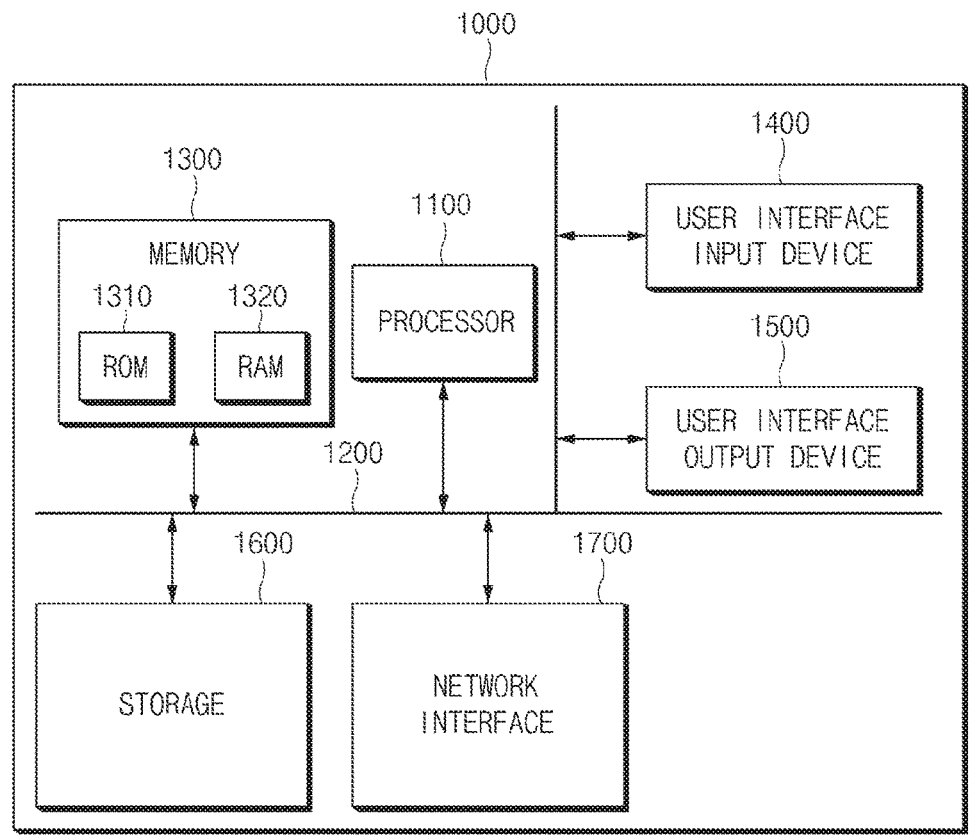
FIG. 9 is a block diagram illustrating a configuration of a computing system which executes a method according to embodiments of the present disclosure.

FIG. 9 is a block diagram illustrating a configuration of a computing system which executes a method according to embodiments of the present disclosure.

As shown in FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (e.g., the memory 1300 and/or the storage 1600) such as a RAM, a flash memory, a ROM, an erasable and programmable ROM (EPROM), an electrically EPROM (EEPROM), a register, a hard disc, a removable disc, or a compact disc-ROM (CD-ROM). An exemplary storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component of the user terminal.

The present disclosure may provide an effect in which a position error does not diverge as if a signal is received from a satellite by receiving an emulated satellite signal from a remote server. The present disclosure may be globally used since a distance is not limited by communicating with a remote server over a wireless communication network. Further, the present disclosure may provide a stable and accurate measurement result of the vehicle available to a system, such as an autonomous driving system, in which high positioning accuracy is required.

The present disclosure may provide an effect in which a more accurate location may be calculated without increasing a price of the system by adding only a server, which communicates with a wireless communication network, to a general navigation device which receives a satellite signal without the necessity of an expensive sensor for calculating a location of the vehicle or a separate means for generating location coordinates.

While the present disclosure has been described with reference to select embodiments, it will be apparent to those skilled in the art that various changes and modifications may be made without departing from the spirit and scope of the present disclosure.

Therefore, embodiments of the present disclosure described herein are not limiting, but illustrative, and the spirit and scope of the present disclosure is not limited thereto. The spirit and scope and the present disclosure should be interpreted by the following claims, it should be interpreted that all technical ideas which are equivalent to the present disclosure are included in the spirit and scope of the present disclosure.

What is claimed is:

1. A navigation device for a vehicle, the device comprising:
   a satellite antenna receiving a satellite signal from a satellite;
   a motion sensor acquiring motion information of the vehicle;
   a wireless communication module transmitting location prediction information for predicting a location of the vehicle and receiving an emulated satellite signal from a server; and
   a location estimating unit generating navigation information of the vehicle using at least one of the satellite signal and the emulated satellite signal.

2. The device of claim 1, wherein, when it is impossible to receive the satellite signal, the wireless communication module transmits the location prediction information of the vehicle.

3. The device of claim 2, wherein it is impossible to receive the satellite signal when:
   a visible satellite number is less than a predetermined reference number,
   an interrupted period of the satellite signal is greater than or equal to a predetermined time, or
   it is predicted that an interrupt signal of the satellite signal will be greater than or equal to the predetermined time.

4. The device of claim 3, wherein the wireless communication module is driven when the interrupted period is greater than or equal to the predetermined time.

5. The device of claim 1, wherein the wireless communication module transmits the location prediction information of the vehicle when receiving the emulated satellite signal.

6. The device of claim 5, wherein, when both of the satellite signal and the emulated satellite signal are available, the location estimating unit uses the satellite signal to generate the navigation information of the vehicle.

7. The device of claim 1, wherein the location prediction information is obtained using at least one of dead-reckoning and map information.

8. The device of claim 1, wherein the location estimating unit generates the navigation information of the vehicle by calculating a location of the vehicle using at least one of the satellite signal and the emulated satellite signal and fusing the calculated location of the vehicle with the motion information of the vehicle.

9. A navigation method for a vehicle, the method comprising:
   receiving a satellite signal from a satellite;
   acquiring motion information of the vehicle using a motion sensor;
   transmitting location prediction information for predicting a location of the vehicle;
   receiving an emulated satellite signal from a server; and
   generating navigation information of the vehicle using at least one of the satellite signal and the emulated satellite signal.

10. The method of claim 9, wherein the satellite signal and the emulated satellite signal are simultaneously received.

11. The method of claim 9, wherein the receiving of the emulated satellite signal from the server comprises:
    verifying a location of an area where it is impossible to receive the satellite signal using map information;
    predicting an interrupt time of the satellite signal;

determining whether the interrupt time is greater than or equal to a predetermined time; and when the interrupt time is greater than or equal to the predetermined time, receiving the emulated satellite signal.

12. The method of claim 11, wherein the area where it is impossible to receive the satellite signal includes an area including any of a tunnel, a canyon area, a street tree, an overpass, and a skyscraper.

13. A system, comprising:
a navigation device for a vehicle generating navigation information of the vehicle using at least one of a satellite signal and an emulated satellite signal; and
a server generating the emulated satellite signal using location prediction information that predicts a location of the vehicle received from the navigation device.

14. The system of claim 13, wherein the navigation device comprises:
a satellite antenna receiving a satellite signal from a satellite;
a motion sensor acquiring motion information of the vehicle;
a first wireless communication module transmitting location prediction information for predicting a location of the vehicle and receiving the emulated satellite signal from the server; and
a location estimating unit generating navigation information of the vehicle using at least one of the satellite signal and the emulated satellite signal.

15. The system of claim 13, wherein the server comprises:
a second wireless communication module receiving the location prediction information of the vehicle from the navigation device and transmitting the emulated satellite signal to the navigation device; and
an emulated satellite signal controller predicting the location of the vehicle based on the location prediction information of the vehicle, calculating a location of a visible satellite based on the predicted location of the vehicle, and generating the emulated satellite signal from the visible satellite.

16. The system of claim 15, wherein the second wireless communication module:
extracts the location prediction information of the vehicle through a decoding process when receiving the location prediction information of the vehicle; and
when the emulated satellite signal is generated, encodes the emulated satellite signal and transmits the encoded emulated satellite signal to the vehicle.

17. The system of claim 15, wherein the emulated satellite signal controller:
transmits the location prediction information of the vehicle to the second wireless communication module; and
predicts the location of the vehicle based on at least one of a time processed in the server, a decoding time, a time when the emulated satellite signal is generated, and an encoding time.

18. The system of claim 13, wherein the emulated satellite signal includes: a satellite identifier (ID), satellite trajectory information, information of a satellite time, atmospheric errors, and an antenna error.

* * * * *